(12) United States Patent
Mobin et al.

(10) Patent No.: US 8,711,906 B2
(45) Date of Patent: Apr. 29, 2014

(54) TRACKING DATA EYE OPERATING MARGIN FOR STEADY STATE ADAPTATION

(75) Inventors: Mohammad Mobin, Orefield, PA (US); Ye Liu, San Jose, CA (US); Amaresh Malipatil, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 771 days.

(21) Appl. No.: 12/941,217

(22) Filed: Nov. 8, 2010

(65) Prior Publication Data

US 2012/0114023 A1    May 10, 2012

(51) Int. Cl.
*H04B 1/38* (2006.01)
*H04L 5/16* (2006.01)

(52) U.S. Cl.
USPC ............ 375/219; 375/224; 375/315; 375/229

(58) Field of Classification Search
USPC .................................. 375/224, 315, 219, 229
See application file for complete search history.

(56) References Cited

U.S. PATENT DOCUMENTS

| | | | | |
|---|---|---|---|---|
| 6,944,692 | B2 * | 9/2005 | Smith et al. | 710/106 |
| 7,822,110 | B1 * | 10/2010 | Doblar | 375/224 |
| 2006/0171485 | A1 * | 8/2006 | Laturell et al. | 375/296 |
| 2006/0222123 | A1 | 10/2006 | Mobin et al. | |
| 2007/0253477 | A1 * | 11/2007 | Abel et al. | 375/233 |

* cited by examiner

*Primary Examiner* — Shuwang Liu
*Assistant Examiner* — Nader Bolourchi

(57) ABSTRACT

In described embodiments, a transceiver includes an eye monitor and margin detector having one or more samplers with corresponding logic. One or more programmable provisioning parameters are defined based on a pre-defined minimum target operating margin for acceptable noise and jitter margins. For example, two programmable provisioning parameters, phase and voltage, correspond with thresholds for margin samplers placed within the eye. Initially, the transceiver applies equalization, after which an inner eye of the transceiver, as detected by the eye monitor, is relatively open with some margin for supporting channels. If the receiver margin goes below this target margin, the eye closes, which is registered by the samplers. In the presence of spectrally rich input data, if the receiver margin goes below this target margin, an updated adaptation of equalizer or other circuit parameters might be initiated; else, adaptation is not generally required.

16 Claims, 5 Drawing Sheets

100

TRACKING DATA EYE OPERATING MARGIN FOR STEADY STATE ADAPTATION

BACKGROUND OF THE INVENTION

1. Field of the Invention

The present invention relates to communication transceiver clock and data recovery, and, in particular, to tracking data in the presence of signal noise.

2. Description of the Related Art

In many data communication applications, serializer and de-serializer (SerDes) devices facilitate the transmission between two points of parallel data across a serial link. Data at one point is converted from parallel data to serial data and transmitted through a communications channel to the second point where it received and converted from serial data to parallel data.

At high data rates frequency-dependent signal loss from the communications channel (the signal path between the two end points of a serial link), as well as signal dispersion and distortion, can occur. As such, the communications channel, whether wired, optical, or wireless, acts as a filter and might be modeled in the frequency domain with a transfer function. Correction for frequency dependent losses of the communications channel, and other forms of signal degradation, often requires signal equalization at a receiver of the signal. Equalization through use of one or more equalizers compensates for the signal degradation to improve communication quality. Equalization may also be employed at the transmit side to pre-condition the signal. Equalization, a form of filtering, generally requires some estimate of the transfer function of the channel to set its filter parameters. However, in many cases, the specific frequency-dependent signal degradation characteristics of a communications channel are unknown, and often vary with time. In such cases, an equalizer with adaptive setting of parameters providing sufficient adjustable range might be employed to mitigate the signal degradation of the signal transmitted through the communications channel. An automatic adaptation process is often employed to adjust the equalizer's response. Equalization might be through a front end equalizer, a feedback equalizer (such as a decision feedback equalizer (DFE)), or some combination of both.

Further, SerDes devices are challenged by operation with very high insertion loss. Some insertion loss may be recovered through an analog front-end equalizer, sometimes in combination with a mixed mode DFE, but, even so, the receiver still operates with very low noise/jitter margin when equalized to a normal operating mode (in contrast to start-up or training modes). When the receiver has no margin at all, the receiver is inoperable, and the receiver must retrain to the input signal. Upon retraining, the receiver determines if the input data is a spectrally rich data stream (i.e., nearly random in contrast to fixed patterns). Once a spectrally rich data stream is present, the equalizer might implement an automatic adaptation process to adjust equalizer coefficients and, thus, the equalizer's response.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention monitors operating margin in a receiver by generating, with an eye monitor, a data eye from a data stream from a channel; and monitoring, with a margin detector, at least one inner position of the data eye based on a corresponding threshold. The threshold corresponds to a relative minimum target operating margin, and the monitored inner position of the data eye is compared to a substantially center position of the eye to generate an indication of operating margin. If the indication of operating margin reaches the minimum target margin, parameters of one or more devices in a signal path of the data stream in the receiver are adaptively set.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

In accordance with embodiments of the present invention, a transceiver includes an eye monitor and margin detector having one or more samplers with corresponding logic. Initially, the transceiver applies equalization, after which an inner eye of the transceiver, as detected by the eye monitor, is relatively open with some margin for supporting channels. One or more programmable provisioning parameters are defined based on a pre-defined minimum target operating margin for an acceptable noise margin and/or an acceptable jitter margin. For example, two programmable provisioning parameters, phase and voltage, correspond with two adjustable "margin samplers" (e.g., latches) placed within the eye. If the receiver margin goes below this target margin, an updated adaptation of equalizer and other circuit parameters is desirable, else, adaptation is either not required or performed as is otherwise specified by system requirements. If the output of the margin samplers is within the inner eye, the decision made by the two margin samplers will match the decision made by a data sampler (e.g., symbol detection latch) placed at the center of the inner eye. Monitoring each margin sampler output (e.g., vertical or horizontal threshold transition), a predefined combination of margin sampler outputs, or a sequence of comparisons between these margin samplers and the data sampler might be employed to detect loss of operating margin.

Figure 1:
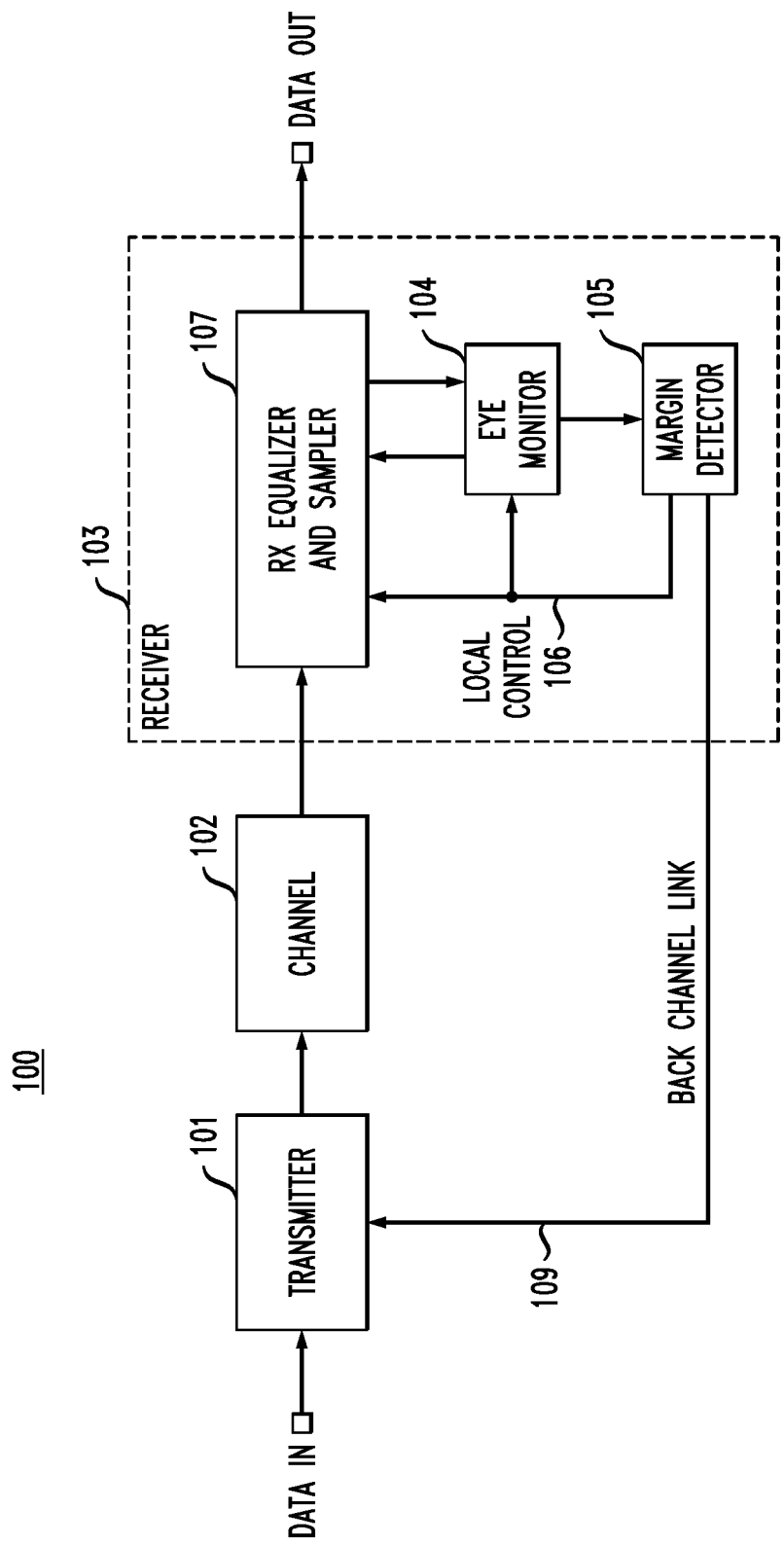
FIG. 1 shows a block diagram of communication system with a receiver having a margin detector operating in accordance with exemplary embodiments of the present invention.

FIG. 1 shows a block diagram of communication system 100 with a receiver operating in accordance with exemplary embodiments of the present invention. System 100 includes transmitter 101 that transmits a signal from transmitter 101 to receiver 103 through communication channel 102. Channel 102, which might be wired, wireless, optical or some other medium, has an associated transfer function, loss characteristics, and/or other means for adding impairments to the signal passing through it. System 100 further includes receiver 103 having receive equalizer and sampler (Rx E&S) 107 to i) sample the signal for data values and ii) correct frequency losses, inter symbol interference (ISI) or other impairments applied to the signal by channel 102. Receiver 103 also includes real-time data eye monitor 104 and margin detector 105 (described below in detail). Margin detector 105 provides local control signal 106 that does one or more of: i) declare loss of operating margin; and ii) initiate adaptation of various parameters of receiver 103 (such as equalizer parameter values of Rx E&S 107). Also shown in FIG. 1 is an optional back-channel link 109 that might allow, for example, for communication to transmitter 101 of signals to initiate adaptation of transmitter equalization and/or gain, or simply indicate loss of margin at receiver 103.

Eye monitor 104 measures eye statistics of input data at receiver 103, and margin detector 105 then detects loss of operating margin and/or presence/absence of spectrally rich data input to receiver 103. Eye statistics are measured data sets that are evaluated to determine inner eye height corresponding with amplitude, or inner eye width corresponding with time, or both inner eye height and width. Such eye statistics might be employed by a clock and data recovery (CDR) circuit of Rx E&S 107 to set, for example, sample timing and equalizer parameters. Although not shown in FIG. 1, eye monitor 104 might also include, or be coupled to, circuitry for detection of spectrally poor input data. Spectrally poor input data might include long series of 1's or 0's, alternating patterns such as 10101 . . . (Nyquist pattern), and sub-Nyquist patterns. Detection of spectrally poor input data might be through techniques known in the art to monitor frequency content of the input data signal. One method of detection includes pattern binning, providing a moving average filter to bin transition densities within a measurement window, and threshold comparison for the bins to detect the presence/absence of spectrally poor input data. Such method and detector is described in U.S. patent application Ser. No. 12/491,760, entitled "Methods and Apparatus for Equalization of Update of Clock Recovery and Equalization" to Kleese et al., filed 25 Jun. 2009, the teachings of which are incorporated herein in their entirety by reference.

Figure 2:
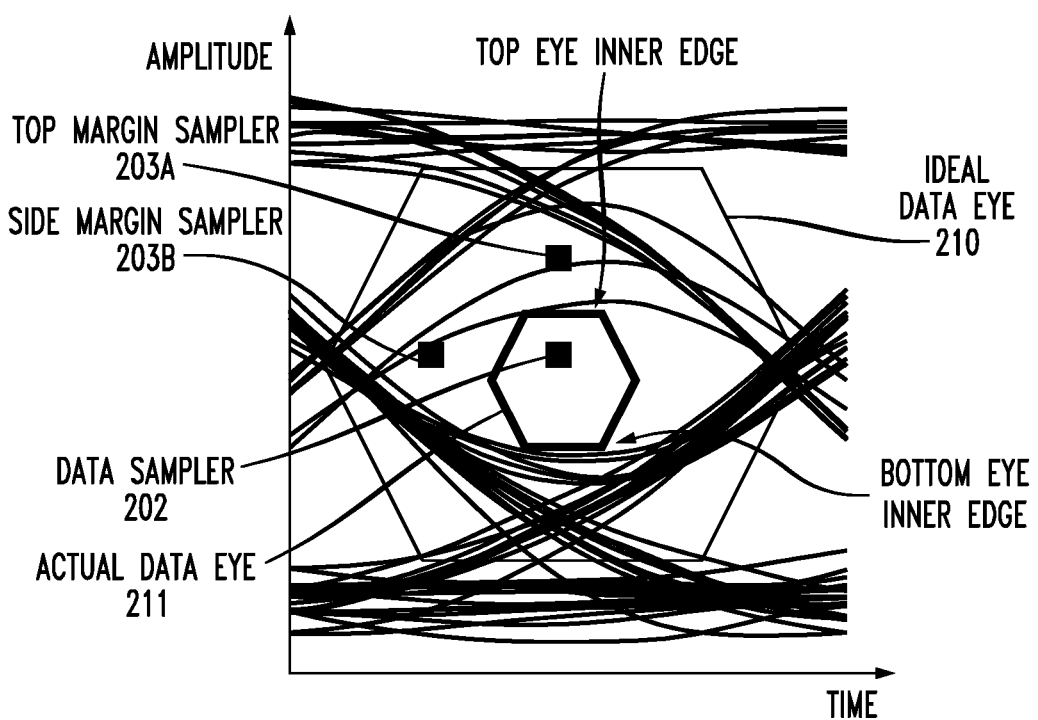
FIG. 2 shows a data eye diagram overlaid with exemplary data sampler and margin samplers.

FIG. 2 shows a data eye diagram 200 overlaid with exemplary data sampler (DS) 202 and margin samplers 203A and 203B. Data eye diagram 200 illustrates a data eye of signal transitions expressed in amplitude versus time superimposed over a predefined period. The data eye, monitored with eye monitor 104, is created as signals transition from low to low, low to high, high to low and high to high. Top and bottom transition samplers (not shown in FIG. 2) placed in the data stream capture the frequency and phase of the data transitions, and this timing is then used by a clock and data recovery circuit to set correct frequency and phase of a sampling clock. Placing a data sampler in the signal path with a threshold and sampling clock equivalent to the amplitude and timing at the center of the eye corresponds to tracking correct timing for making a decision as to the value of a received data symbol. Horizontal positions (e.g., horizontal phase opening) within the eye generally correspond to a phase of operating margin, while vertical positions (e.g., vertical voltage opening) within the eye generally correspond to an amplitude of operating margin.

Ideally, without noise, jitter, and other loss and dispersion effects, the data eye will exhibit a relatively ideal shape, illustrated as ideal eye 210. In practice, as described previously, the shape of the data eye changes with noise, jitter, other loss and dispersion effects, and temperature and voltage variations. The shape of the data eye also changes due to equalization applied to input signal of the receiver, illustrated as actual eye 211. In some systems, equalization is also applied by a transmitter's equalizer, further altering the shape of the eye from the ideal.

An indication of operating margin is obtained by placing top margin sampler 203A and side margin sampler 203B at the top eye inner edge and the side inner eye edge, respectively, of the data eye. Since information of the threshold voltage level that would be achieved for perfect equalization is not known until equalization is applied, regular transceiver equalization is performed first. After equalization, the inner eye of the transceiver is open with some margin for supporting channels. In preferred embodiments, pre-defined targets might be set for operating margin. Such pre-defined targets for amplitude and unit interval operation might be related to design sensitivity specifications of the design process for a given implementation.

Figure 3:
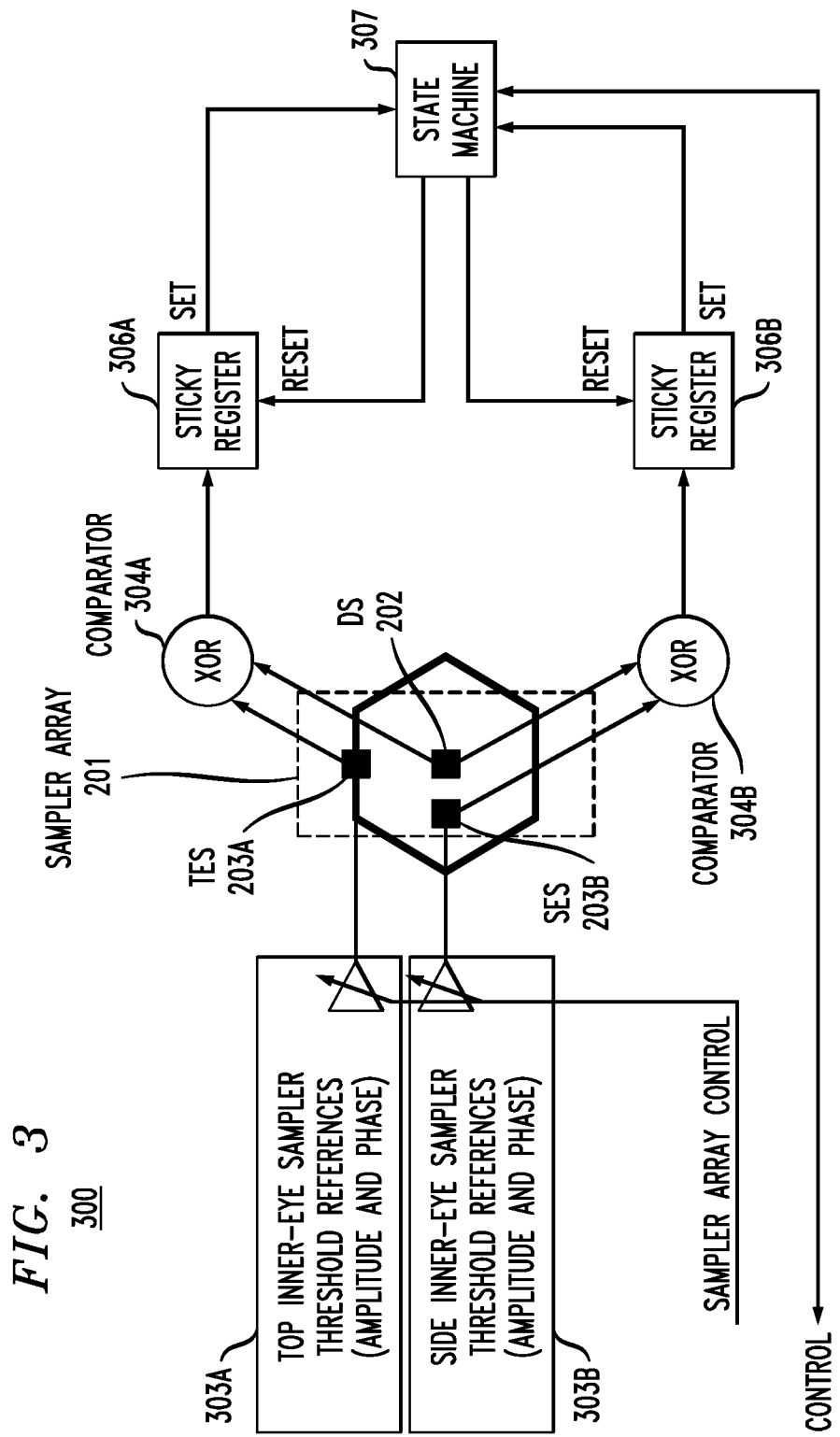
FIG. 3 shows an exemplary margin detector as might be employed by the system of FIG. 1.

FIG. 3 shows an exemplary margin detector 300 as might be employed by the system of FIG. 1. Margin detector 300 comprises top and side inner eye margin samplers (TES and SES) 203A and 203B, respectively, which might be implemented as latches having programmable thresholds. The programmable thresholds include both amplitude (vertical—voltage) and time (horizontal—phase) threshold values for each latch. TES 203A and SES 203B receive corresponding thresholds from top inner-eye sampler reference (TSR) 303A and side inner-eye sampler reference (SSR) 303B, which might be implemented as reference voltage/phase values set through a sampler array control signal to control amplitude and phase sampling at the given positions of the inner eye. TSR 303A and SSR 303B are threshold value sets that might correspond to loss of margin due to voltage (amplitude) variation and phase variation of the data inner eye, respectively. TES 203A and SES 203B, might be part of a larger sampler array also including DS 202 as well as additional samplers for other measurement functions.

Margin detector 300 further comprises comparators 304A and 304B, sticky registers 306A and 306B, and state machine 307. Comparator 304A performs an exclusive OR (XOR) operation on the output of TES 203A and DS 202); and comparator 304B performs an exclusive OR (XOR) operation on the output of SES 203B and DS 202). The output of comparator 304A is applied to sticky register 306A which registers a transition of the XOR operation from a first logic state (e.g., logic 0) to a second logic state (e.g., logic 1). In a similar manner, the output of comparator 304B is applied to, and registered by, sticky register 306B. Generally, a sticky register, once set to a logic state value (e.g., set to a value of one) at any time, will maintain the value until reset (e.g., reset to a value of zero).

A margin detector controller, shown as state machine 307, is employed to process the information provided by sticky registers 306A and 306B and, once processed, initiate the adaptation process, detect the end of the adaptation process, and reset the corresponding sticky register. Consequently, state machine 307 might be employed to provide external control signals (shown as "Control") to enable or disable adaptation operations, and declare loss of operating margin. In addition, state machine 307 might receive output from a detector that declares the presence/absence of spectrally rich data. Based on the declared presence or absence of spectrally rich data, state machine 307 might further enable disable, or otherwise modify adaptation operations.

Figure 4:
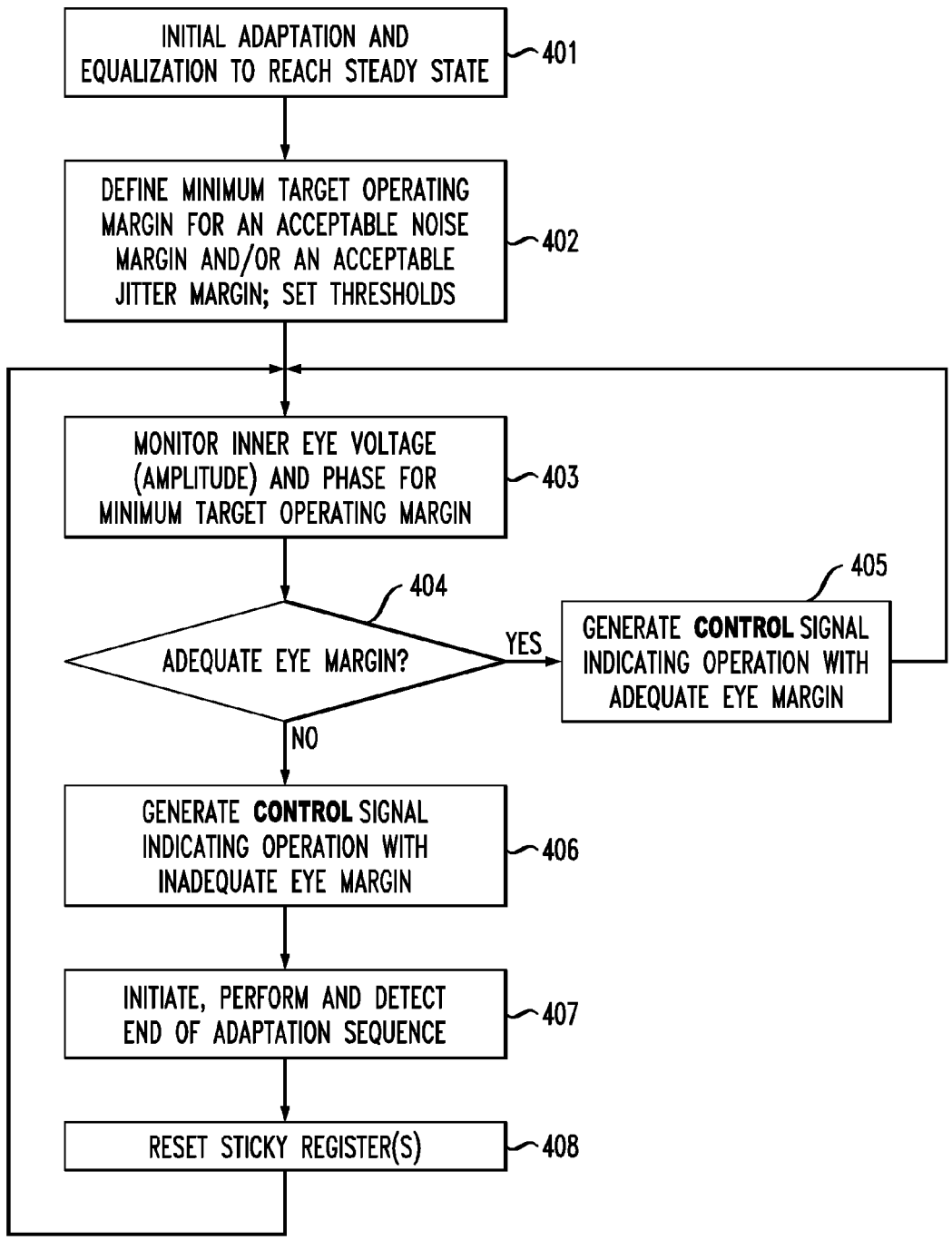
FIG. 4 shows an exemplary method of operation for the margin detector of FIG. 3.

FIG. 4 shows an exemplary method of operation 400 for margin detector 300. At step 401, the method completes an initial adaptation and equalization to reach steady state. At step 402, the minimum target operating margin for an acceptable noise margin and/or an acceptable jitter margin is defined for TSR 303A and SSR 303B are threshold values, so, if receiver 103 data eye operating margin goes below this target operating margin, an updated adaptation of equalization and other parameters is enabled due to loss of operating margin; otherwise, adaptation of parameters is not necessarily required. Monitoring of inner eye voltage (amplitude) for target noise margin and the inner eye monitoring phase for target jitter margin commences at step 403. If the measured values of TES 203A and SES 203B are each within the inner eye, the corresponding decisions of TES 203A and SES 203B match the decision made by data sampler 202, the symbol detection latch placed at the center of the inner eye.

Monitoring is accomplished through comparison, by the XOR operation of comparators 304A and 304B well known in digital logic circuitry, between the output values of TES 203A and DS 202, and between the output values of SES 203B and DS 202. At step 404, a test determines if the output of comparators 304A and 304B, as registered in status bits of corresponding sticky registers 306A and 306B, indicates that the inner eye has closed to a point less than the minimum target operating margin for an acceptable noise margin and/or an acceptable jitter margin. The comparison output value, embodied as output of comparators 304A and 304B, is, for example, logic zero if the symbol has margin more than the defined minimum target margin, corresponding to a relatively "open" eye.

If the symbol margin drops below the defined minimum target operating margin, for the XOR operation between output values of either i) TES 203A and DS 202 or ii) SES 203B and DS 202, at least one comparison output value transitions to logic one. For preferred embodiments, the XOR operation is performed over all symbols or a periodic block of symbols according to provisioning. If an XOR operation yields logic one for a received symbol train, a status register (e.g., the output of a sticky register) is set. Once this status register is set it is reset to logic zero unless cleared with a register write operation or other means for clearing the status bit.

If the test of step 404 determines that the symbol has margin more than the defined minimum target margin, then state machine 307 indicates normal operation with adequate eye margin through the output signal Control at step 405. If the test of step 404 determines that the symbol has margin less than than the defined minimum target margin, at step 406, state machine 307 declares loss of operating margin through the output signal Control indicating inadequate eye margin. At step 407, the state machine 307 then enables adaptation operation by initiating, monitoring, and detecting the conclusion of the adaptation sequence. Upon conclusion of the adaptation sequence at step 407, at step 408, the sticky register(s) are reset, and the method returns to step 403. Note that while the present embodiment is described for actions when the sticky bit is set, other embodiments might monitor the sticky bit over multiple occurrences of the sticky bit being set (e.g., monitor a sequence of sticky bits equal logic 1 and when the number of consecutive sticky bits reaches a threshold, then begin adaptation for steady state update, preferably with spectrally rich input data).

While the exemplary embodiment of FIG. 2 shows two margin detector eye margin samplers, the present invention is not so limited. For example, a single eye margin sampler might be employed, positioned either at the side or at the top of the inner eye, to indicate a loss of operating margin but lower, for example, the cost of a given implementation. Two eye margin samplers are shown one top and one to the left side of the eye center, but one skilled in the art might place the vertical sampler either top or bottom, and might place the horizontal sampler either left or right of the eye center. Similarly, one skilled in the art might employ more than two eye margin samplers, such as top, bottom, left and right side error samplers, to increase accuracy. Each sampler might have a corresponding threshold control for voltage and/or phase, and a corresponding comparator to compare the margin sampler output with the output of the data sampler.

Returning to FIG. 1, an indication of adequate operating margin obtained by margin detector 300 might be employed by system 100 in a number of applications, including steady state (SS) adaptation of various circuit parameters (e.g., equalizer and gain) in either receiver 103 (front end equalizer and/or DFE)), transmitter 101 (though back-channel link 109), or both. In this operation, first, detection is desired of a spectrally rich input data pattern. Spectrally poor input data patterns might be the continuous presence of a Nyquist pattern (e.g., 10101010 . . . ) or sub-Nyquist pattern (e.g., 11001100 . . . pattern, or 111000111000 . . . , or 1111000011110000 . . . and so on) or other dominance of 1's or 0's at the input of receiver 103. If such pattern exists, indicating the presence of spectrally poor input data, SS adaptation is suspended, even if margin detector 105 detects loss of operating margin, because adaptation of circuits, such as an equalizer, with a tone like pattern generally causes divergence of the adaptation parameters. When SS adaption qualifications are met, including spectrally rich input data, SS adaptation is activated for various adapted units.

SS adaptation might be implemented by, for example, a sequencer with a series of timeslots. The operation for a timeslot as indicated by the sequencer enables or disables an adaptation for a given operation (e.g., equalizer or gain), and the operations of the sequencer are programmable by a user. An exemplary sequencer provisioning is presented in Table 1 below,

TABLE 1

| Sequence Number | TX EQ | VGA | LE-GD | DFE | Blwc | Time | Mode |
|---|---|---|---|---|---|---|---|
| 0 | 1 | 0 | 1 | 0 | 1 | 25 ms | Blind: 00 |
| 1 | 1 | 0 | 1 | 0 | 1 | 25 ms | Blind: 00 |
| 2 | 1 | 0 | 1 | 0 | 1 | 25 ms | Blind: 00 |
| 3 | 1 | 0 | 0 | 1 | 1 | 10 ms | Blind: 00 |
| 4 | 1 | 0 | 0 | 1 | 1 | 10 ms | Blind: 00 |
| 5 | 0&!diag | 1&!diag | 0&!diag | 1&!diag | 1&!diag | 250 ms | SS: 01 |
| 6 | 0 | 1 | 0 | 1 | 1 | 250 ms | SS: 10 or 11 |
| 7 | . . . | . . . | . . . | . . . | . . . | . . . | SS: 10 or 11 |
| 8 | . . . | . . . | . . . | . . . | . . . | . . . | SS: 10 or 11 |

In Table 1, the adaptation blocks include, i) a transmitter equalization unit (TX EQ), ii) variable gain adaptation unit (VGA), iii) linear equalization unit (LE-GD), iv) decision feedback equalization unit (DFE), and v) baseline wander correction unit (Blwc). Two modes are shown: blind and steady state (SS). During blind mode, the system is in the process of training or otherwise initializing the receiver; during SS mode the receiver has initialized and receives data that is spectrally rich. If adaptation of other transmitter settings is desired, other embodiments might similarly include adaptation of variable gain, linear equalization, and filter parameters of the transmitter in addition to the transmitter equalizer (e.g., TX EQ).

If an entry in Table 1 has a "1", then adaptation for that equalization unit is enabled. The sequencer has an integer number, N, of entries (e.g., 0, 1, 2, 3, 4, 5, . . . , N). Each entry is sequentially adapted. Consequently, for the example timeslot 1 of Table 1, adaptations of TX EQ, LE-GD, and Blwc parameters are enabled, with adaptation of timeslot 1 over a period of 25 ms. In contrast, at timeslot 6, adaptations of VGA, DFE, and Blwc parameters are enabled with adaptation of timeslot 1 over a period of 250 ms. For each entry, adaptation is over a predefined time period (e.g., 10 ms to N ms). Each entry has an associated mode: bind mode (00) where equalization is disruptive and bit errors are expected; steady state mode (01) where equalization is perfomed on live traffic and bit errors are not allowed; and modes 10 and 11 defined for other activities not related to tracking operating margin for equalization. For example, a SerDes device might include a diagnosis mode. To allow for this operations associated with diagnosis mode, a diag value is specified. When diag=1 the SerDes is in diagnostic mode, SS adaptation is suspended even though the adaptation unit is provisioned to 1.

Figure 5:
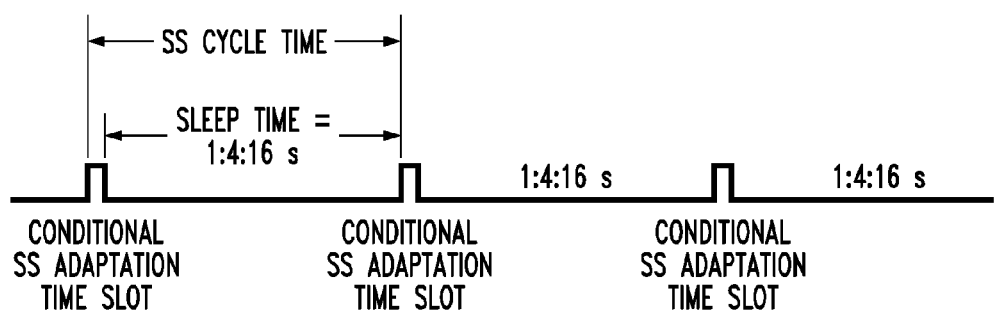
FIG. 5 shows time division multiplexing of i) constrained steady state equalizer adaptation and ii) a sleep mode as might be employed by the system of FIG. 1.

Adaptation of a transceiver's equalizer(s) or other circuits might also be performed at a decimated rate. Such decimated rate might also be employed by system 100 of FIG. 1. Time division multiplexing of i) constrained SS adaptation and ii) a sleep mode is illustrated in FIG. 5. As shown in FIG. 5, when a SS adaptation slot appears, steady state adaptation of equalizer parameters is triggered if two conditions are met: first, a sticky status bit is set to 1 (or some consecutive number of set bits reached) and second, spectrally rich data patterns are detected at the receiver input. After the SS operation for equalizer adaptation is completed, the system enters sleep mode. The sleep mode duration might be programmable. In one exemplary implementation, the sleep mode time is programmable from 1 ms to 16 ms in steps of 4 ms. A pseudo code of this operation is presented below,

```
If (sticky status bit ==1 & Spectrally_Rich_Data_Present
    Perform one SS cycle
    Reset sticky status bit
else
    Do no SS adaptation.
```

A transceiver operating in accordance with one or more embodiments of the present invention might provide for the following advantages. The transceiver might exhibit increased performance by effectively detecting receiver loss of operating margin. In addition, the transceiver might indicate or otherwise identify adaptation units for update, as well as operate at a decimated rate. Consequently, such transceiver might exhibit increased speed and reliability in unfavorable communication environments.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments of the present invention have been described with respect to processes of circuits, including possible implementation as a single integrated circuit, a multi-chip module, a single card, or a multi-card circuit pack, the present invention is not so limited. As would be apparent to one skilled in the art, various functions of circuit elements may also be implemented as processing blocks in a software program. Such software may be employed in, for example, a digital signal processor, micro-controller, or general purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports may be referred to by the same name and are interchangeable for purposes here.

It will be further understood that various changes in the details, materials, and arrangements of the parts which have been described and illustrated in order to explain the nature of this invention may be made by those skilled in the art without departing from the scope of the invention as expressed in the following claims.

We claim:

1. An apparatus for monitoring operating margin in a receiver, the apparatus comprising:
    an eye monitor configured to generate a data eye from a data stream received from a channel;
    at least one margin detector, each margin detector configured to:
        monitor at least one inner position of the data eye based on a corresponding threshold, the threshold corresponding to a relative minimum target operating margin, and
        compare the monitored inner position of the data eye to a substantially center position of the data eye to generate an indication of operating margin; and
    a first controller configured to, if the indication of operating margin reaches the minimum target operating margin, adaptively set parameters of one or more devices in a signal path of the data stream in the receiver based on the indication of operating margin, the one or more devices adapted in a determined order, wherein the first controller is further configured to perform steady state adaptation of parameters in accordance with a determined rate in a determined timeslot of operation of the receiver.

2. The apparatus of claim 1, wherein the receiver further comprises:
    a spectral density detector configured to detect a spectrally rich data stream applied to the receiver; and
    a second controller, coupled to the spectral density detector, configured to provide a control signal to the receiver based on the indication of operating margin,
    wherein, the second controller is further configured to enable adaptively setting parameters of the one or more devices based on the detection of the spectrally rich data stream.

3. The apparatus of claim 2, wherein the one or more devices comprise at least one of an amplifier gain, a filter, and an equalizer.

4. The apparatus of claim 1, wherein a margin detector comprises:
    a first sampler configured to monitor a horizontal position of the data eye, the horizontal position corresponding to a phase margin;
    a second sampler configured to monitor a vertical position of the data eye, the vertical position corresponding to an amplitude margin; and
    a third sampler configured to sample the substantially center position of the data eye, the center position corresponding to a data symbol.

5. The apparatus of claim 4, wherein the margin detector comprises a first comparator, a second comparator, a first register, and a second register, wherein:
    the first comparator compares an output of the first sampler to an output of the third sampler, the first register storing an output of the first comparator; and
    the second comparator compares an output of the second sampler to the output of the third sampler, the second register storing an output of the second comparator.

6. The apparatus of claim 5, wherein, if at least one output of the first comparator and the second comparator indicates a mis-match between the compared inputs, a status bit of a corresponding one of the first register and the second register is set, the set status bit an indication that operating margin reached the minimum target margin.

7. The apparatus of claim 1, wherein the first controller is coupled to a transmitter of the data stream, the first controller further configured to adapt parameters of one or more devices in a signal path of the data stream in the transmitter based on the indication of operating margin, the one or more devices adapted in a determined order.

8. The apparatus of claim 1, wherein the margin detector is coupled to a transmitter configured to provide the data stream, wherein the transmitter, based on the indication of operating margin, adaptively sets parameters of each device of the transmitter in a signal path of the data stream, each device comprising at least one of an amplifier gain, a filter, and an equalizer.

9. The apparatus of claim 1, wherein the apparatus is embodied in a Serializer-DeSerializer (SerDes) device.

10. A method of monitoring operating margin in a receiver, the method comprising:
    generating, with an eye monitor, a data eye from a data stream from a channel;
    monitoring, with at least one margin detector, at least one inner position of the data eye based on a corresponding threshold, the threshold corresponding to a relative minimum target operating margin;
    comparing the monitored inner position of the data eye to a substantially center position of the data eye to generate an indication of operating margin;

adaptively setting parameters of one or more devices in a signal path of the data stream in the receiver if the indication of operating margin reaches the minimum target operating margin, the one or more devices adapted by a sequencer in a determined order, and performing steady state adaptation of parameters in accordance with a determined rate in a determined timeslot of operation of the receiver.

11. The method of claim 10, further comprising:

detecting a spectrally rich data stream applied to the receiver;

providing a control signal to the receiver based on the indication of operating margin and the detection of the spectrally rich data stream; and enabling, via the control signal, the adaptively setting parameters of the one or more devices based on the detection of the spectrally rich data stream, the one or more devices comprising at least one of an amplifier gain, a filter, and an equalizer.

12. The method of claim 10, comprising:

monitoring, with a first sampler, a horizontal position of the data eye, the horizontal position corresponding to a phase margin;

monitoring, with a second sampler, a vertical position of the data eye, the vertical position corresponding to an amplitude margin; and monitoring with a third sampler, the substantially center position of the data eye, the center position corresponding to a data symbol.

13. The method of claim 12, comprising:

comparing, with a first comparator, an output of the first sampler to an output of the third sampler, and storing, in a first register, an output of the first comparator; and comparing, with a second comparator, an output of the second sampler to the output of the third sampler, and storing, in a second register, an output of the second comparator.

14. The method of claim 13, wherein, if indicating a mismatch between the compared inputs of at least one output of the first comparator and the second comparator, setting a status bit of a corresponding one of the first register and the second register, the set status bit an indication of operating margin reaching the minimum target operating margin.

15. The method of claim 10, further comprising:

coupling the margin detector to a transmitter of the data stream; and adaptively setting parameters of each device of the transmitter in a signal path of the data stream, each device comprising at least one of an amplifier gain, a filter, and an equalizer, based on the indication of operating margin.

16. A non-transitory machine-readable storage medium, having encoded thereon program code, wherein, when the program code is executed by a machine, the machine implements a method for monitoring operating margin in a receiver, the method comprising the steps of:

generating, with an eye monitor, a data eye from a data stream from a channel;

monitoring, with at least one margin detector, at least one inner position of the data eye based on a corresponding threshold, the threshold corresponding to a relative minimum target operating margin;

comparing the monitored inner position of the data eye to a substantially center position of the data eye to generate an indication of operating margin;

adaptively setting parameters of one or more devices in a signal path of the data stream in the receiver if the indication of operating margin reaches the minimum target operating margin, the one or more devices adapted by a sequencer in a determined order, and performing steady state adaptation of parameters in accordance with a determined rate in a determined timeslot of operation of the receiver.

* * * * *